United States Patent
Lin

(10) Patent No.: US 8,315,378 B2
(45) Date of Patent: Nov. 20, 2012

(54) HYBRID CIRCUIT WITHOUT INDUCTORS

(75) Inventor: Fang Lin, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1406 days.

(21) Appl. No.: 11/984,180

(22) Filed: Nov. 14, 2007

(65) Prior Publication Data
US 2009/0122845 A1    May 14, 2009

(51) Int. Cl.
| | |
|---|---|
| H04M 1/00 | (2006.01) |
| H04M 9/00 | (2006.01) |
| H04M 7/00 | (2006.01) |
| H04M 3/00 | (2006.01) |
| H01P 1/00 | (2006.01) |

(52) U.S. Cl. ......... 379/404; 379/344; 379/394; 333/263
(58) Field of Classification Search .................. None
See application file for complete search history.

(56) References Cited

U.S. PATENT DOCUMENTS 4,326,109 A * 4/1982 McGee et al. ................ 379/402
6,731,752 B1   5/2004 Chaplik et al.
2004/0151302 A1 * 8/2004 Sabouri et al. ........... 379/390.04
2006/0062395 A1 * 3/2006 Klayman et al. .................. 381/1
2006/0133519 A1 * 6/2006 Tsatsanis et al. ............. 375/260

FOREIGN PATENT DOCUMENTS
EP    1 128 570 A2    8/2001
EP    1 128 570 A3    2/2002

OTHER PUBLICATIONS

European Search Report for European Application No. EP 08 01 8834 mailed Mar. 11, 2009, 5 pgs.

* cited by examiner

Primary Examiner — Fan Tsang
Assistant Examiner — Jeffrey Lytle
(74) Attorney, Agent, or Firm — Sterne, Kessler, Goldstein & Fox P.L.L.C.

(57) ABSTRACT

A hybrid circuit without inductors is provided. Embodiments can be used in high-speed communication devices, including Cable modem and Digital Subscriber Line (DSL) devices. In particular, embodiments can be used in Very High Speed DSL (VDSL) devices. Embodiments provide a cheap and compact solution to the echo rejection problem in high-speed communication devices. Furthermore, embodiments perform at least comparably to conventional solutions with respect to key performance measures.

20 Claims, 6 Drawing Sheets

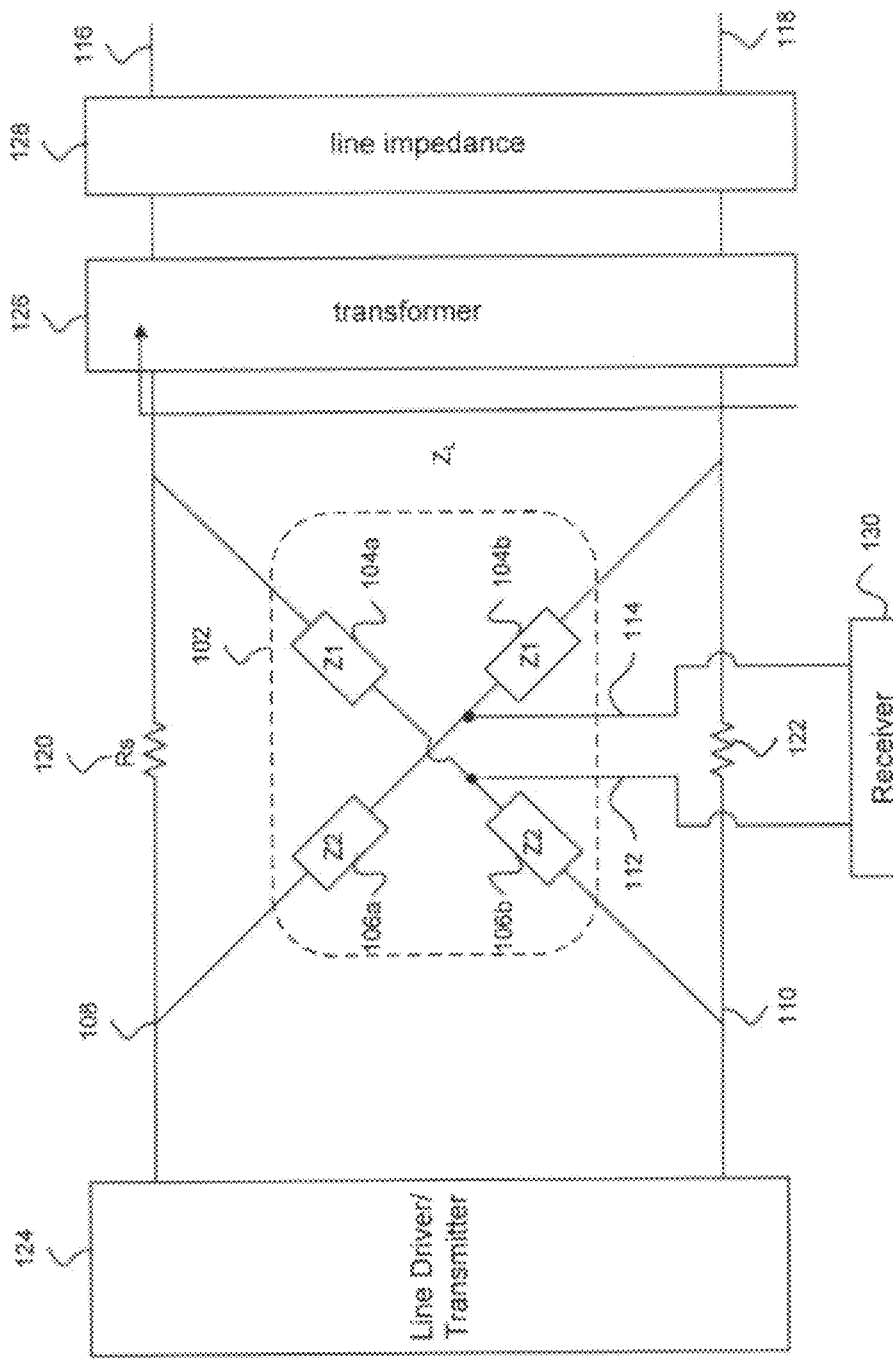
(Conventional)
FIG. 1

(Conventional) FIG. 2

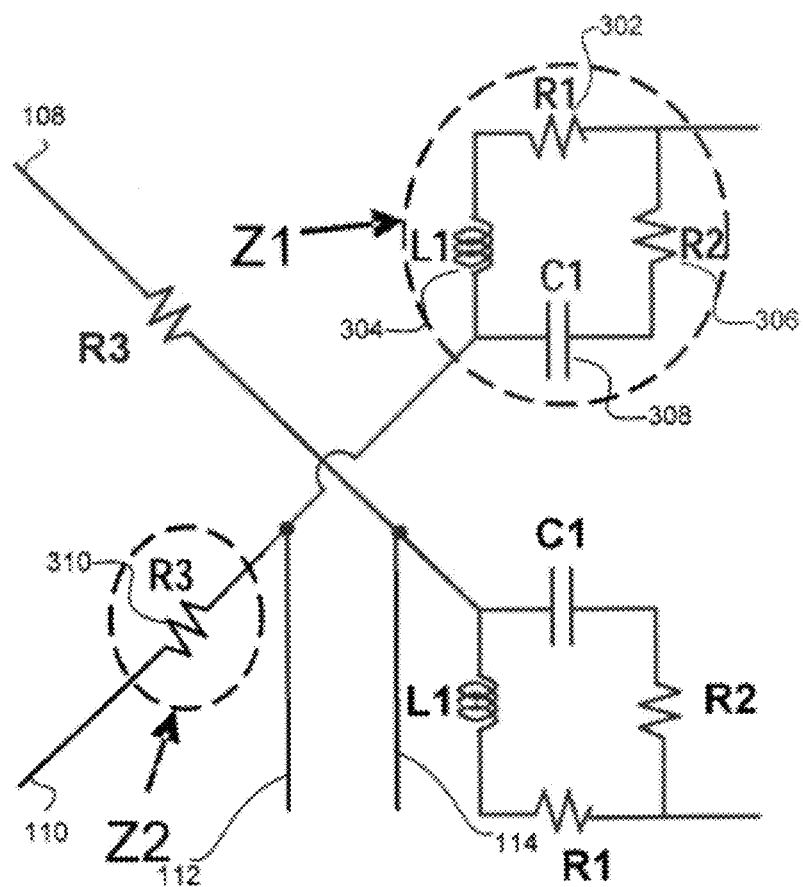
(Conventional)
FIG. 3

HYBRID CIRCUIT WITHOUT INDUCTORS

BACKGROUND OF THE INVENTION

1. Field of the Invention

The present invention relates generally to high-speed communication, and more particularly to a hybrid circuit for use in high-speed communication devices.

2. Background Art

In high-speed communication devices, such as Cable modem and Digital Subscriber Line (DSL) devices, hybrid circuits are used in the analog front end (AFE) circuits to isolate transmitted and received signals. In particular, hybrid circuits are used to reject echo due to transmitted signals from reaching the receiver.

Conventional hybrid circuit solutions use inductive components to compensate for inductive elements present in line transformers, which generally couple the high-speed communication devices to the communication network.

However, inductive components are expensive, generate as well as pick up noise, and result in non-linearities in the performance of the hybrid circuit.

As such, there is a need to eliminate inductive components from hybrid circuits used in high-speed communication devices.

BRIEF SUMMARY OF THE INVENTION

A hybrid circuit without inductors is provided herein. Embodiments can be used in high-speed communication devices, including Cable modem and Digital Subscriber Line (DSL) devices. In particular, embodiments can be used in Very High Speed DSL (VDSL) devices. Embodiments provide a cheap and compact solution to the echo rejection problem in high-speed communication devices. Furthermore, embodiments perform at least comparably to conventional solutions with respect to key performance measures.

In another aspect, a high-speed communication device that uses a hybrid circuit according to embodiments of the present invention is provided herein.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 is a block diagram illustration of an analog front end (AFE) circuit, which can be used in a communication device.

FIG. 3 illustrates an example hybrid circuit, which is conventionally used in the AFE circuit of FIG. 1.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Figure 2:
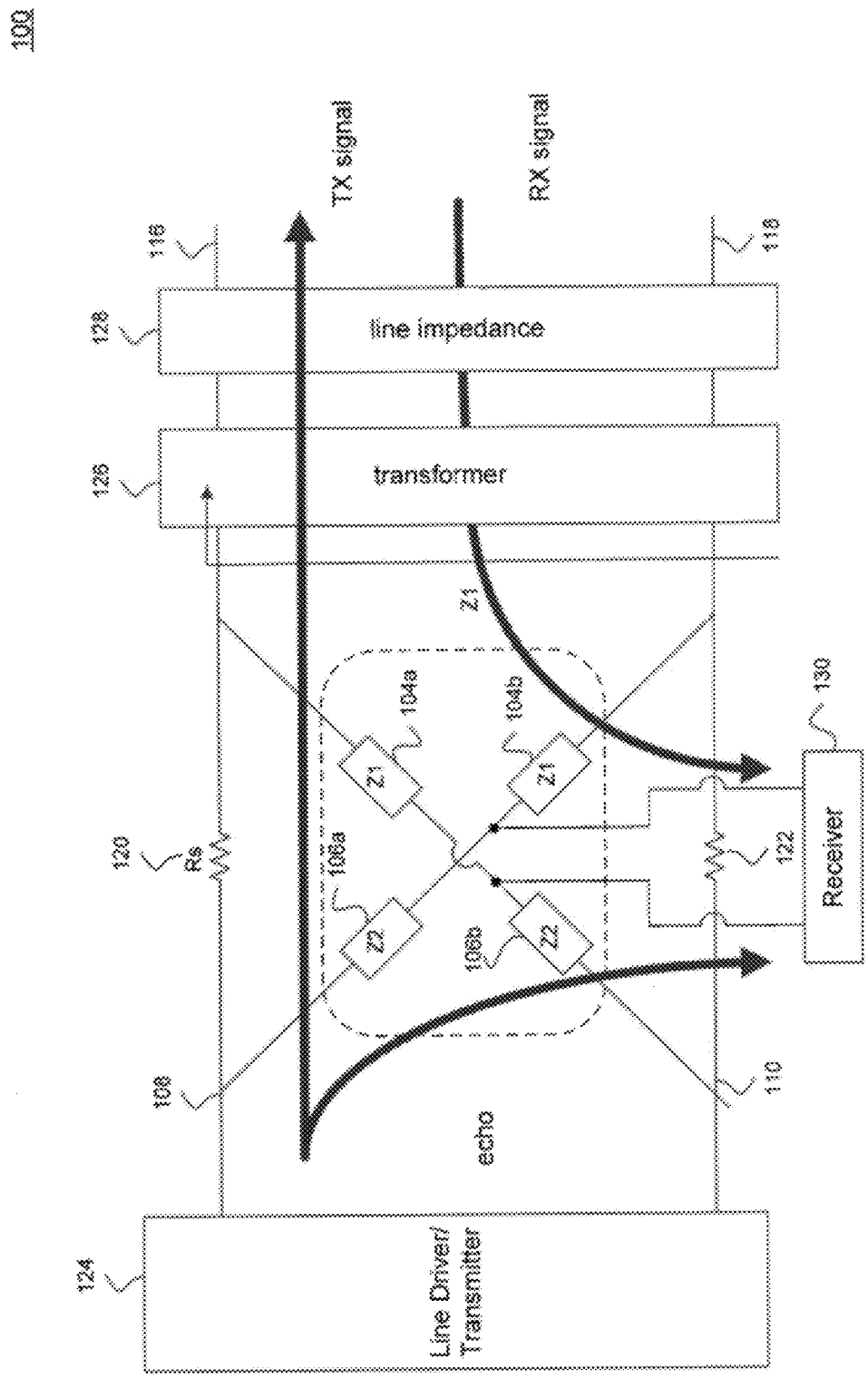
FIG. 2 illustrates signal flows in the AFE circuit of FIG. 1.

FIG. 1 is a block diagram illustration of an analog front end (AFE) circuit 100, which can be used in a communication device. For example, AFE circuit 100 can be used in Cable modem and Digital Subscriber Line (DSL) communication devices. Particularly, AFE circuit 100 is suitable for Very High Speed DSL (VDSL) communication devices and will be described herein in reference to a VDSL communication system. This description, however, is provided for the purpose of illustration only and is not limiting as to functional uses of the circuit.

AFE circuit 100 includes a hybrid circuit 102, a transformer 126, and a line impedance 128. AFE circuit 100 further includes resistors 120 and 122, as shown in FIG. 1.

Typically, a line driver/transmitter 124 connects to input terminals 108 and 110 of hybrid circuit 100. Line driver/transmitter 124 provides transmit signals in the form of differential signals, which are transferred by AFE circuit 100 to a central office (CO) (not shown in FIG. 1), for example, of a VDSL communication system. Similarly, receive signals from the CO are received as differential signals through output terminals 116 and 118 of AFE circuit 100. The receive signals are transferred by AFE circuit 100 to a receiver 130. In AFE circuit 100, receiver 130 is a differential input receiver having inputs at nodes 112 and 114 of hybrid circuit 102, as shown in FIG. 1.

Hybrid circuit 102 is typically used to enable duplex communication in the communication device using AFE circuit 100. One function of hybrid circuit 102 includes isolating receiver 130 from transmit signals being transferred through AFE circuit 100. In other words, transmit signals are prevented from entering the receiver. This function is also known as echo rejection. Another function of hybrid circuit 102 includes providing an appropriate receiver transfer function for signals received from the CO, i.e., appropriate signal amplification/rejection at specified frequency ranges. For illustration, FIG. 2 shows example signal flows in AFE circuit 100. Signal path 202 illustrates the flow of transmit signals. Signal path 204 illustrates the flow of receive signals, and signal path 206 illustrates the potential flow of transmit signals towards the receiver inputs (echo flow).

Generally, hybrid circuit 102 includes a matched impedance network. For example, as shown in FIG. 1, hybrid circuit 102 includes impedance circuits 104a, 104b, 106a, and 106b, wherein impedance circuits 104a and 106a are respectively matched with impedance circuits 104b and 106b. For ease of illustration, matched circuits 104a and 104b will be referred to hereinafter as impedance circuit Z1 (having impedance value Z1), and matched circuits 106a and 106b will be referred to as impedance circuit Z2 (having impedance value Z2).

Transformer 126 is coupled at output terminals of hybrid circuit 102. Transformer 126 is a line transformer that serves as an interface between circuits at the user end and circuits at the CO of the communication system. As a result, transformer 126 also serves to protect circuits at the user end from voltage surges (e.g., due to lightning strikes) that could occur over the line connecting the user and the CO. Typically, transformer 126 is designed to have a flat frequency response for the transmit/receive signal bandwidths.

AFE circuit 100 may further include a line impedance 128, as shown in FIG. 1. Line impedance 128 may include resistive, capacitive, and/or inductive components. Accordingly, an equivalent impedance $Z_L$, encompassing the impedances from transformer 126 to output terminals 116 and 118 of AFE circuit 100, is observed at the output of hybrid circuit 102, as illustrated in FIG. 1.

Generally, in high-speed communication systems such as DSL, for example, transmit signal bandwidths are relatively wide. Accordingly, hybrid circuit 102 needs to have correspondingly wide frequency echo rejection characteristics.

It can be shown that the transfer function from the line driver/transmitter outputs (input terminals 108 and 110) to the receiver inputs (nodes 112 and 114) is equal to:

$$\frac{V_{rx}}{V_{echo}} = \frac{Z_2}{Z_1 + Z_2}\left[\frac{Z_L}{Z_L + R_s} - \frac{Z_1}{Z_2}\right] \quad (1)$$

where $V_{rx}$ is the voltage at the receiver inputs due to voltage from the transmitter, $V_{echo}$. This transfer function determines the echo rejection characteristics of hybrid circuit 102.

From equation (1), it can be recognized that maximum echo rejection by hybrid circuit 102 (i.e., 100% echo rejection) can be achieved when the ratio $$\frac{Z_L}{Z_L + R_S}$$

is equal to the ratio $$\frac{Z_1}{Z_2},$$

which results in the transfer function described in (1) having a value of zero. In practice, however, achieving a 100% echo rejection is a challenging task, particularly with the presence of inductive components in impedance $Z_L$, which makes $Z_L$ frequency-variable. For example, one such inductive component is due to a leakage inductance in line transformer 126, which commonly results from imperfect magnetic linking in the transformer.

The leakage inductance in line transformer 126 can be modeled as an additional inductive impedance coupled in series with the primary winding of the transformer. This causes the value of $Z_L$ and, correspondingly, the ratio $$\frac{Z_L}{Z_L + R_S}$$

to increase with frequency.

As such, without the ratio $$\frac{Z_1}{Z_2}$$

tracking the ratio $$\frac{Z_L}{Z_L + R_S},$$

the echo rejection capability of hybrid circuit 102 degrades as frequency varies, with the value of the transfer function described in (1) tending away from zero.

To compensate for the variance of $Z_L$ with frequency, conventional hybrid circuits resort to using inductive elements in impedance $Z_1$, to thereby track changes in the ratio $$\frac{Z_L}{Z_L + R_S}$$

with equivalent changes in the ratio $$\frac{Z_1}{Z_2}.$$

FIG. 3 illustrates an example hybrid circuit 300, which is conventionally used in AFE circuit 100 of FIG. 1. As shown, hybrid circuit 300 uses a resistive-inductive-capacitive (RLC) network for impedance $Z_1$ and a resistive network 310 for impedance $Z_2$. The RLC network includes a resistive-inductive (RL) path (resistor 302 and inductor 304) coupled in parallel with a resistive-capacitive (RC) path (resistor 306 and capacitor 308). In particular, inductor 304 is placed in the RLC network such that it causes the impedance of $Z_1$ to vary in the same direction as impedance $Z_L$ as frequency varies, thereby maintaining the difference between the ratios $$\frac{Z_L}{Z_L + R_S} \text{ and } \frac{Z_1}{Z_2}$$

small.

As such, hybrid circuit 300 can be designed to have high echo rejection capabilities. However, inductors make hybrid circuit 300 a costly solution to the echo rejection problem. Furthermore, inductors can generate as well as pick up noise and cause certain non-linearities in the hybrid circuit frequency response. The latter causes a degradation in the receiver transfer function of the hybrid circuit. Accordingly, a hybrid circuit without inductors is desirable.

Figure 4:
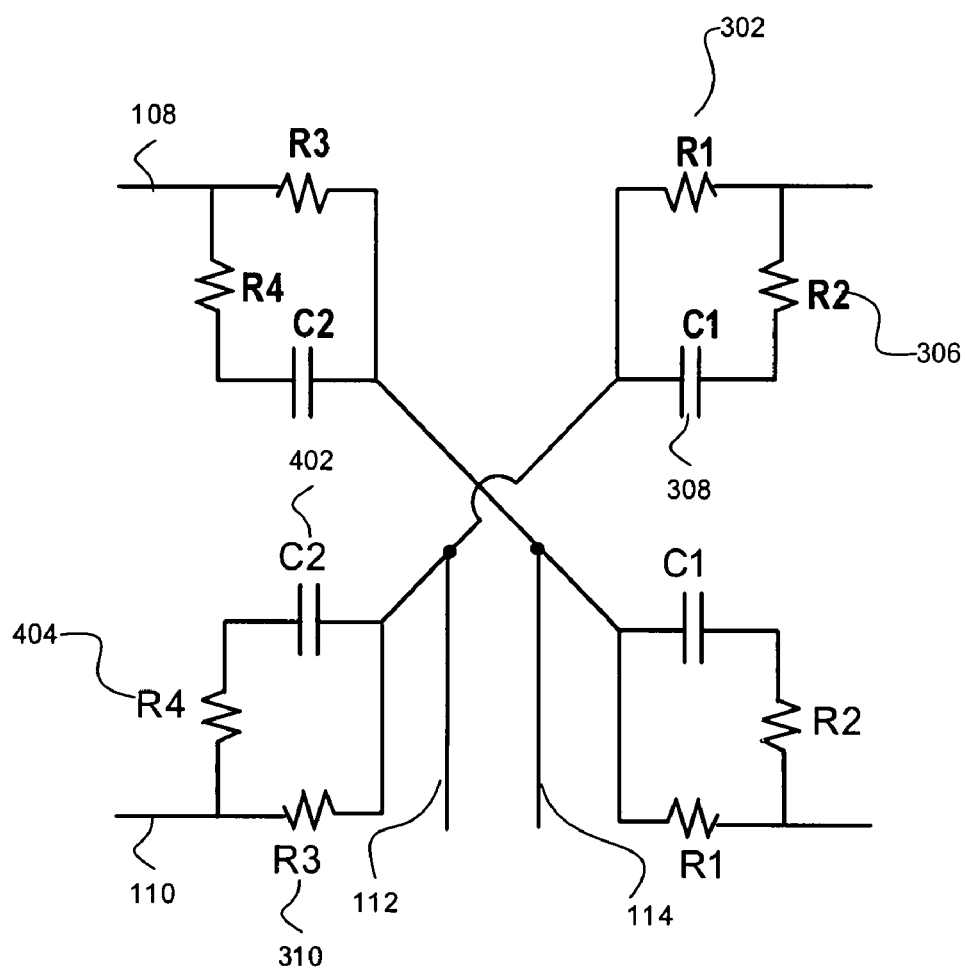
FIG. 4 illustrates an example hybrid circuit without inductors, which can be used in the AFE circuit of FIG. 1.

FIG. 4 illustrates an example hybrid circuit without inductors 400, which can be used in AFE circuit 100 of FIG. 1. As would be understood by a person skilled in the art based on the teachings herein, multiple variations of hybrid circuit 400 can be designed. These variations are within the scope of embodiments of the present invention.

As shown in FIG. 4, inductor 304 is eliminated from impedance $Z_1$, which now includes only resistors 302 and 306 and capacitor 308. On the other hand, impedance $Z_2$ is modified to include a resistive-capacitive (RC) path (capacitor 402 and resistor 404) coupled in parallel with resistor 310.

As such, hybrid circuit 400 provides a variable $$\frac{Z_1}{Z_2}$$

ratio, by means of varying impedance $Z_2$ instead of impedance $Z_1$. Also, note that the placement of capacitor 402 in impedance $Z_2$ provides that $Z_2$ varies in the opposite direction to $Z_L$ as frequency varies. Accordingly, the ratio $$\frac{Z_1}{Z_2}$$

continues to track the ratio $$\frac{Z_L}{Z_L + R_S}$$

as frequency varies, thereby compensating for any inductive components in $Z_L$.

Hybrid circuit 400 provides a cheap and compact solution to the echo rejection problem in high-speed communication devices. Furthermore, hybrid circuit 400 performs at least comparably to conventional solutions with respect to key performance measures, as will be further described below.

Figure 5:
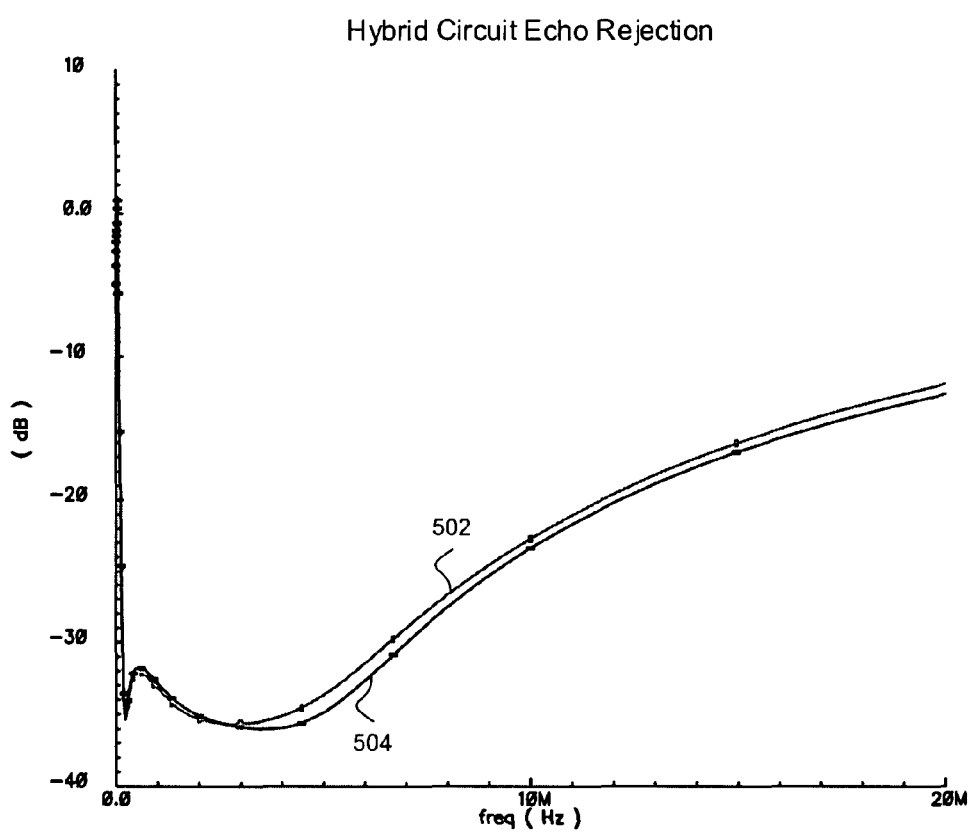
FIG. 5 is a performance comparison of the echo rejection capabilities of the hybrid circuits of FIG. 3 and FIG. 4.

FIG. 5 is a performance comparison plot 500 of the echo rejection capabilities of hybrid circuits 300 and 400. As shown, curve 504, which illustrates the performance of hybrid circuit 400, closely tracks curve 502, which illustrates the performance of hybrid circuit 300, over the entire simulated frequency range. In fact, curve 504 is slightly lower than curve 502 for frequencies higher than approximately 3 MHz, indicating better echo rejection by hybrid circuit 400 over that frequency range.

Figure 6:
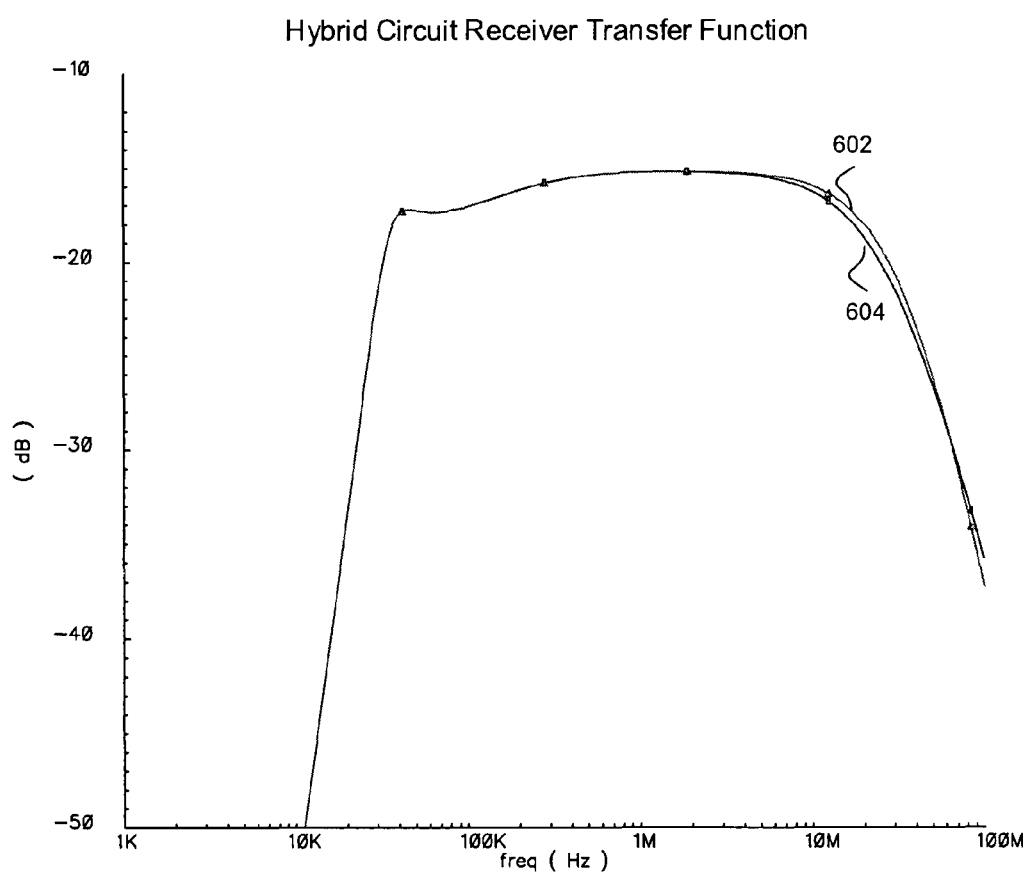
FIG. 6 is a comparison of the receiver transfer functions of the hybrid circuits of FIG. 3 and FIG. 4.

FIG. 6 is a comparison plot 600 of the receiver transfer functions of hybrid circuits 300 and 400. As described above, in addition to echo rejection, another function of the hybrid circuit is to provide a suitable transfer function for received signals. As with echo rejection, hybrid circuit 400 provides comparable transfer function performance, illustrated by curve 604 in FIG. 6, to that of hybrid circuit 300, illustrated by curve 602.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A hybrid circuit, comprising:
an impedance network, including first, second, third, and fourth impedance circuits,
wherein said first and second impedance circuits are respectively matched to said third and fourth impedance circuits,
wherein said first and second impedance circuits each includes a series resistive-capacitive (RC) path coupled in parallel with a resistive path, and
wherein an impedance ratio of said first and second impedance circuits is configured to vary with frequency in accordance with an output impedance observed at outputs of said hybrid circuit.

2. The hybrid circuit of claim 1, wherein an end of said first impedance circuit is coupled to an end of said second impedance circuit.

3. The hybrid circuit of claim 1, wherein an end of said third impedance circuit is coupled to an end of said fourth impedance circuit.

4. The hybrid circuit of claim 1, wherein an impedance of said second impedance circuit is frequency-variable.

5. The hybrid circuit of claim 1, wherein an impedance of said second impedance circuit is configured to vary with frequency in an opposite direction to an inductive impedance observed at the outputs of the hybrid circuit.

6. The hybrid circuit of claim 1, wherein the hybrid circuit is used in a high-speed communication device, and wherein the hybrid circuit provides isolation between transmitted and received signals in said high-speed communication device.

7. The hybrid circuit of claim 1, wherein the hybrid circuit is used in a high-speed communication device, and wherein the hybrid circuit provides echo rejection of transmitted signals to prevent said transmitted signals from reaching a receiver of said high-speed communication device.

8. The hybrid circuit of claim 1, wherein the hybrid circuit is used within a Digital Subscriber Line (DSL) communication device.

9. The hybrid circuit of claim 8, wherein the DSL communication device is a Very High Speed DSL (VDSL) device.

10. The hybrid circuit of claim 1, wherein the hybrid circuit is used within a Cable modem communication device.

11. A high-speed communication device, comprising:
a line driver configured to provide differential transmit signals;
a receiver configured to receive differential receive signals; and
an analog front end (AFE) circuit, comprising:
  a hybrid circuit having input terminals coupled to said line driver and providing input terminals to said receiver;
  a line transformer coupled at outputs of said hybrid circuit; and
  a line impedance coupled to said transformer,
wherein said hybrid circuit comprises:
  an impedance network, including first, second, third, and fourth impedance circuits,
  wherein said first and second impedance circuits are respectively matched to said third and fourth impedance circuits, wherein said first, second, third, and fourth impedance circuits each includes a series resistive-capacitive (RC) path coupled in parallel with a resistive path, and
  wherein an impedance ratio of said first and second impedance circuits is configured to track over frequency an inductive impedance component of a combined output impedance of said line transformer and line impedance as observed by said hybrid circuit.

12. The high-speed communication device of claim 11, wherein the high-speed communication device is a Digital Subscriber Line (DSL) communication device.

13. The high-speed communication device of claim 11, wherein the high-speed communication device is a Very High Speed DSL (VDSL) communication device.

14. The high-speed communication device of claim 11, wherein the high-speed communication device is a Cable modem communication device.

15. The high-speed communication device of claim 11, wherein said hybrid circuit is configured to provide echo rejection of the differential transmit signals to prevent said differential transmit signals from reaching the receiver of said high-speed communication device.

16. The high-speed communication device of claim 11, wherein an impedance of said second impedance circuit is frequency-variable.

17. The high-speed communication device of claim 11, wherein said impedance ratio is configured to vary with frequency according to the combined output impedance of said line transformer and line impedance as observed by said hybrid circuit.

18. The high-speed communication device of claim 11, wherein an impedance of said second impedance circuit is configured to vary with frequency in an opposite direction to the inductive impedance component of the combined output impedance of said line transformer and line impedance as observed at the outputs of the hybrid circuit.

19. The high-speed communication device of claim 11, wherein said first, second, third, and fourth impedance circuits each consists of (a) resistive components and (b) capacitive components.

20. A hybrid circuit, comprising:
an impedance network, including first, second, third, and fourth impedance circuits,
wherein said first and second impedance circuits are respectively matched to said third and fourth impedance circuits,
wherein said first, second, third, and fourth impedance circuits each includes a series resistive-capacitive (RC) path coupled in parallel with a resistive path, and
wherein an impedance ratio of said first and second impedance circuits is configured to vary with frequency in accordance with an output impedance observed at outputs of said hybrid circuit.

* * * * *